Figure 1:
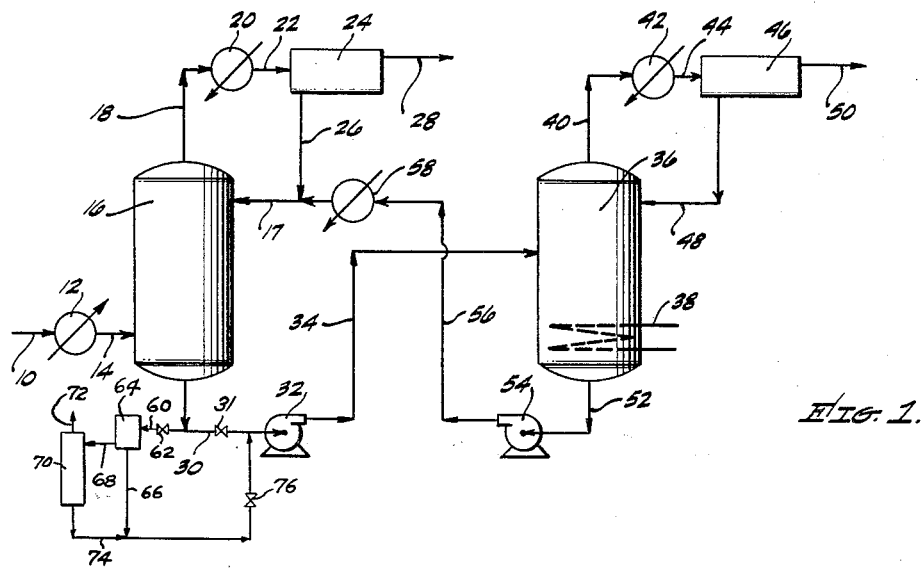

Dec. 18, 1962     T. K. SHERWOOD     3,068,627
SEPARATION OF HYDROCARBONS WITH AN ADSORBENT SLURRY
Filed July 7, 1958

INVENTOR.
THOMAS K. SHERWOOD,
BY
Richard C. Hartman
ATTORNEY.

United States Patent Office 3,068,627
Patented Dec. 18, 1962

3,068,627
SEPARATION OF HYDROCARBONS WITH AN ADSORBENT SLURRY
Thomas K. Sherwood, Concord, Mass., assignor to Union Oil Company of California, Los Angeles, Calif., a corporation of California
Filed July 7, 1958, Ser. No. 746,909
13 Claims. (Cl. 55—22)

This invention relates to the adsorptive separation of hydrocarbon mixtures, and in particular relates to an adsorptive separation proceess in which a zeolitic metallo alumino silicate adsorbent is employed in the form of a slurry which is circulated between the adsoprtion and desorption stages of the process.

While the ability of certain zeolitic metallo alumino silicate adsorbents to separate hydrocarbons on the basis of their molecular size or shape is well known (see, for example, U.S. Patent No. 2,818,455) the application of this unique property to commercial-scale operation has not as yet been realized. The reason lies partially in the disadvantages which are inherent in any gas-solids contacting system, e.g., the relatively low heat-transfer coefficients of gases and granular solids, and partially in certain characteristics of this particular type of adsorbent. Thus, the zeolitic metallo alumina silicate adsorbents are characterized by relatively poor mechanical strength; consequently, they cannot be used in continuous flow moving bed systems without accepting an appreciable loss due to attrition. Also, the solids fines produced by attrition of the adsorbent tend to be carried along in the gas stream and impart severe abrasive loads on the gas circulation equipment.

It is, therefore, a primary object of this invention to provide an improved adsorptive separation process in which a granular zeolitic metallo alumino silicate adsorbent is circulated between an adsorption stage and a desportion stage.

Another object of the invention is to provide a means for reducing attrition losses in a process in which a granular zeolitic metallo alumnio silicate adsorbent is circulated from one stage to another in a hydrocarbon adsorptive separation process.

A further object is to provide a means for improving the transfer of heat to and from a moving bed or stream of granular metallo alumino silicate adsorbent.

Other and related objects will be apparent from the following detailed description of the invention, and various advantages not specifically referred to herein will be apparent to those skilled in the art upon employment of the invention in practice.

I have now found that the foregoing objects and their attendant advantages can be realized by employing the zeolitic metallo alumino silicate adsorbent in the form of a slurry in a suitable suspending liquid. More particularly, I have found that in separating hydrocarbon mixtures, especially in separating straight-chain hydrocarbons from branched-chain and aromatic hydrocarbons, employing the aforesaid type of zeolitic adsorbent in a moving bed system, the difficulties due to the characteristic frangibility of this type of adsorbent can be largely precluded by suspending the solid granular adsorbent in a suitable liquid to form a pumpable slurry. Such slurry is conveniently and easily handled by pumps, coolers, heat exchangers, and other process equipment without excessive abrasion, and what few solid fines are produced are carried along in the suspending liquid rather than in the gas stream. Handling the adsorbent in the form of a slurry in accordance with the invention also improves the efficiency with which heat can be transferred to or from the adsorbent. The invention thus consists of a separation process in which a hydrocarbon feed mixture is contacted with a slurry stream of a zeolitic metallo alumino silicate adsorbent to form a rich adsorbent slurry containing selectively adsorbed components of the feed mixture. The rich adsorbent is then treated to desorb the adsorbed hydrocarbons therefrom, and the adsorbent is then returned to the initial contacting step.

Considering now the process of the invention in detail, the adsorbent itself is a granular partially dehydrated zeolitic metallo alumino silicate having substantially uniform pores between about 4 A. and about 5.5 A. in diameter. Certain naturally occurring minerals, e.g., chabazite, analcite and gmelinite can be partially dehydrated to obtain such type of silicate, but I greatly prefer to employ synthetic products. The latter are conveniently prepared by heating stoichiometric quantities of alumina and silica with an excess of sodium hydroxide and thereafter washing out the excess caustic. The sodium zeolite so prepared is then partially dehydrated to obtain a product having substantially uniform pores of about 4 A. in diameter and having a composition corresponding substantially to $[Na_2O \cdot Al_2O_3 \cdot (SiO_2)_2]$ on a water-free basis. This type of product is available commercially from the Linde Company under the trade name "Molecular Sieves 4A." Zeolitic adsorbents of the present type having pores of a diameter greater than about 4 A. are conveniently obtained by exchanging part of the sodium cation with other metals. For example, the sodium zeolite prepared as just described is treated with a concentrated solution of a calcium salt, e.g., calcium chloride, at superatmospheric pressure and at 20° C.–175° C., washed with water to remove excess calcium chloride, and thereafter partially dehydrated by heating to obtain a synthetic zeolite having substantially uniform pores of about 5 A. in diameter and having an approximate composition corresponding to

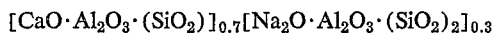

$$[CaO \cdot Al_2O_3 \cdot (SiO_2)]_{0.7}[Na_2O \cdot Al_2O_3 \cdot (SiO_2)_2]_{0.3}$$

on a water-free basis. This particular product is likewise available commercially from the Linde Company under the trade name "Molecular Sieves 5A." Cations other than calcium may be similarly introduced into the material by ion exchange to obtain adsorbents of the present class having pores whose diameters differ slightly according to the identity of such cations. Further details regarding the manner of preparing the present type of adsorbent are to be found in British Patent No. 777,232.

As is known, the present type of adsorbent exerts preferential adsorptive forces on those hydrocarbon molecules whose minimum dimensions are equal to or slightly less than the diameter of the pores of the absorbent. Thus, the straight-chain paraffiins and olefins, which have cross-chain dimensions of about 4–5 A. are strongly and readily adsorbed by adsorbents having pore diameters of about 4–5 A., e.g., Linde "Molecular Sieves 5A." However, the branched-chain paraffins and olefins, naphthalenes and aromatic hydrocarbons all have minimum molecular dimensions in excess of 5 A. and are hence substantially non-adsorbable on 5 A. adsorbents. The latter are thus selective for the separation of the straight-chain hydrocarbons from the non-straight-chain hydrocarbons.

Ethylene and propylene have a cross-chain dimension slightly less than 4 A.; accordingly, these olefins are strongly and readily adsorbed by adsorbents having 4 A. diameter pores, e.g., Linde "Molecular Sieves 4A." However, the normal olefins containing more than 3 carbon atoms, as well as the normal paraffins and non-straight-chain hydrocarbons mentioned above, have minimum molecular dimensions greater than 4 A. and are hence substantially non-adsorbable on a 4 A adsorbent. Thus, "Molecular Sieves 4A" are particularly suited for the recovery of ethylene and/or propylene from refinery gas streams.

Since, according to the invention, the adsorbent is employed in liquid suspension form, its particle size should be such that even at points of low rates of flow its rate of gravitational settling is low. The optimum particle size will depend upon the nature of the suspending liquid and the conditions of operation of the process, but is usually between about 50 and 400 mesh, and is preferably between about 100 and 300 mesh.

The liquid in which the finely-divided adsorbent is suspended can be any organic liquid which, under the conditions of operation, has a boiling point sufficiently above that of the highest boiling component of the feed mixture so that the feed mixture can be handled in the vapor phase without excessive vaporization of the suspending liquid. Preferably the boiling point, or the initial point of the boiling range, of the suspending liquid is at least about 20° F., usually at least about 75° F., above the upper end of the boiling range of the feed mixture. The suspending liquid must also be substantially unadsorbable on the solid adsorbent, and must be at least a partial solvent for the selectively adsorbed component or components of the feed mixture, i.e., it should dissolve at least about 0.1 percent by weight of said component or components, and may even be completely miscible therewith. Finally, the suspending liquid must be inert in the sense that it does not react chemically with any of the components of the system. This requirement precludes the use of water or aqueous solutions.

In general, the preferred suspending liquids are hydrocarbons having the foregoing qualifications. In separating straight-chain hydrocarbons such as normal paraffins and normal olefins from a feed mixture containing non-straight-chain hydrocarbons, the preferred suspending liquid is any branched-chain paraffin or branched-chain olefin, naphthene, or aromatic hydrocarbon of appropriate boiling point. In separating ethylene and/or propylene from a hydrocarbon feed mixture comprising the same and employing a 4 A. adsorbent, the suspending liquid may be a straight-chain paraffin or a higher olefin or one of the branched-chain naphthenic or aromatic hydrocarbons referred to above. While the suspending liquid is preferably a hydrocarbon, the chemical structure of the liquid is immaterial. Accordingly, any organic liquid having the aforementioned requisite characteristics can be employed.

The ratio of adsorbent solids to suspending liquid in the slurry can be varied between wide limits. In the interests of securing maximum adsorptive capacity per unit weight or volume of the adsorbent slurry, such ratio is usually as high as possible. However, the solids-liquid ratio should not be so high that the slurry is too viscous to be handled by conventional pumps and other processing equipment. Usually, such ratio is such that the slurry contains between about 5 and about 50 percent by weight of the adsorbent and between about 50 and about 95 percent by weight of the suspending liquid. While the solids-liquid ratio of the slurry is ordinarily maintained substantially constant throughout the process, it can be varied if desired. Thus, under some conditions of operation such ratio can advantageously be higher in the adsorption stage than in the desorption stage, or vice versa.

The process of the invention is applicable to any hydrocarbon separation process in which one or more of the components of a gaseous or vaporized hydrocarbon mixture are selectively adsorbed on a partially dehydrated zeolitic metallo alumino silicate having substantially uniform pores between about 4 A. and about 5.5 A. in diameter. Usually the hydrocarbon feed mixture is one which is not readily separated by conventional methods, such as distillation, crystallization, solvent extraction, etc., although it should be noted that since the present type of adsorbent effects separation on the basis of molecular size and shape rather than molecular weight or boiling point, it is particularly well adapted to use in separating mixtures of relatively wide boiling range. Also, such hydrocarbon mixture is usually of petroleum origin, although the process is adapted to the separation of hydrocarbon mixtures derived from coil tar, oil shale, tar sands, and the like. Straight-run gasolines and other straight-run fractions, cracked gasolines, reformed gasolines from reforming or aromatization processes, refinery fuel gas streams, cracked gas streams, light gas oils and lubricating fractions can all be processed in accordance with the invention, and for the most part the separation effected is one of separating straight-chain paraffins and/or straight-chain olefins from non-straight-chain hydrocarbons or of separating ethylene and/or propylene from admixture with higher olefins, paraffins, aromatics, etc.

Operation-wise, the present process is a conventional selective adsorption process comprising an adsorption stage, in which the feed mixture in gaseous or vaporized form is contacted with the adsorbent to obtain a raffinate or reject stream comprising the non-adsorbed components of the feed mixture and a rich adsorbent containing the adsorbed components of the feed, and a desorption stage in which the said rich adsorbent is treated to recover the adsorbed components therefrom and to regenerate the lean adsorbent. The latter is then recycled to the adsorption stage for re-use in the next succeeding cycle of operation.

The adsorption is carried out as a conventional gas-liquid contacting operation, employing any of the techniques and equipment ordinarily employed for such purpose. Usually, such contacting is countercurrent with the adsorbent slurry flowing by gravity down through the adsorption vessel countercurrent to a rising gaseous or vapor stream of the feed. However, concurrent contacting can be employed if desired. Since the adsorption is carried out in the vapor phase, the temperature within the adsorption zone is maintained above the boiling point of the highest boiling component of the feed mixture. Such temperature can vary from as low as about 0° F. to as high as about 800° F. Ordinarily, normally liquid feed mixtures are vaporized prior to being introduced into the adsorption zone, but, if desired, such vaporization can be effected within the adsorption zone itself. The pressure within the adsorption zone is usually atmospheric, but can be either subatmospheric or superatmospheric.

When the subsequent desorption operation is effected by heating or vacuum stripping, the raffinate gas stream from the adsorption stage consists essentially of the non-adsorbed components of the feed mixture and a small quantity of the suspending liquid. If desired, the latter can be separated, as by condensation or fractional distillation, and returned to the system. When the desorption operation is carried out with the aid of a displacement exchange fluid, as hereinafter more fully explained, the raffinate stream will contain an appreciable amount of the displacement exchange fluid, and it is usually desirable that such fluid be separated and returned to the system. In addition to the raffinate stream, the adsorption operation produces a rich extract comprising the adsorbent slurry containing the selectively adsorbed components of the feed mixture. As stated, such product is passed to the desorption stage wherein the adsorbed components of the feed are recovered and the adsorbent slurry is conditioned for return to the adsorption stage. Desorption of the rich adsorbent can be carried out in any of several ways. In accordance with one mode of operation, the rich adsorbent is desorbed by vacuum stripping, i.e., by reducing the pressure on the adsorbent and collecting the vapors which are thereby evolved. Such operation can be carried out directly in the rich adsorbent slurry or, more preferably, the rich solid adsorbent is first separated from the suspending liquid and is vacuum stripped as a granular solid. The stripped solid is then resuspended in the suspending liquid and is returned in slurry form to the adsorption stage.

Alternately, the rich adsorbent can be desorbed thermally, i.e., by heating to drive off the adsorbed hydrocarbons and restore the adsorbent to a lean condition. The temperature employed will depend primarily on the temperature at which the adsorption operation is carried out, but will usually be at least about 30° F., preferably about 200° F.–350° F., above the adsorption temperature. Again, the entire slurry can be so treated, or the solid adsorbent can be separated from the suspending liquid prior to heating, and thereafter resuspended in the liquid for further use in the process.

A third, and preferred, method of treating the rich adsorbent to recover the adsorbed hydrocarbons therefrom involves the use of a so-called "displacement exchange fluid," i.e., the use of a fluid which is capable of replacing the adsorbed hydrocarbon. Such a fluid differs from a stripping fluid in that it physically enters the pores of the rich adsorbent and displaces the adsorbed hydrocarbons therefrom, whereas a stripping fluid operates by lowering the partial pressure of the adsorbed hydrocarbons and does not enter the pores of the adsorbent to any substantial extent. A number of materials have been suggested for use as displacement exchange fluids in separation processes employing adsorbents of the present type. For example, the aforementioned U.S. Patent No. 2,818,455 discloses the use of certain hydrocarbons for this purpose. In addition to having the property of adsorbability on the rich adsorbent, the displacement exchange fluid should be readily separable from both the adsorbed and non-adsorbed components of the hydrocarbon feed mixture, as well as from the liquid in which the adsorbent is suspended. It should also be inert in the sense that it does not react chemically with any of the components in the system and does not substantially affect the adsorptive capacity of the adsorbent for the adsorbable components of the feed mixture. It should also be soluble in the suspending liquid to the extent referred to previously in connection with the solubility of the adsorbed hydrocarbon in such liquid. Preferably such material has a separation factor with respect to the adsorbed component of the feed mixture which is between about 0.1 and about 10. Such factor is determined by allowing a mixture of the displacement exchange fluid (A) and the adsorbed components (B) of the feed mixture to contact the adsorbent until equilibrium is established. The mol ratio of the two materials in both the adsorbed and non-adsorbed phases is determined, and the separation factor is calculated as follows:

Separation factor
$$= \frac{\text{mol ratio } A/B \text{ in adsorbed phase}}{\text{mol ratio } A/B \text{ in non-adsorbed phase}}$$

In addition to the hydrocarbon displacement exchange fluids disclosed in U.S. Patent No. 2,818,455, there can also be employed carbon dioxide, ammonia, hydrogen sulfide, 1-halo-alkanes, dihalo-alkanes, n-alkyl amines, di-n-alkyl amines, di-n-alkyl sulfides, di-n-alkyl oxides, etc. The chemical nature of the fluid is immaterial so long as it possesses the requisite physical properties referred to above. Ordinarily, it is preferred to employ a straight-chain paraffin or olefin, preferably one which occurs in the feed mixture, when separating straight-chain hydrocarbons from non-straight-chain hydrocarbons, whereas carbon dioxide or hydrogen sulfide is preferred when separating ethylene and/or propylene from other hydrocarbons.

In the present process, desorption by means of a displacement exchange fluid is effected in the conventional manner, i.e., the rich adsorbent is contacted with the displacement exchange fluid employing any of the usual gas-liquid contacting techniques. The flow of displacement fluid and rich adsorbent is usually countercurrent, and it is preferable to operate the desorption stage under substantially the same conditions of temperature and pressure as the adsorption stage. The products of the displacement exchange desorption operation are (1) a lean adsorbent slurry containing adsorbed displacement exchange fluid, and (2) an extract gas stream comprising desorbed hydrocarbons and the displacement exchange fluid. The extract gas is treated to separate therefrom the displacement exchange fluid (which is returned to the desorption stage), and the desorbed hydrocarbons are passed to storage. The lean adsorbent is returned to the adsorption stage for re-use in the next succeeding cycle of operation. Since the recycled lean adsorbent contains adsorbed displacement exchange fluid, and such fluid is itself displaced by the adsorbable components of the feed gas mixture, the raffinate stream from the adsorption stage comprises desorbed displacement exchange fluid as well as the non-adsorbed components of the feed gas. Accordingly, the raffinate gas stream is treated to separate the displacement exchange fluid before passing the non-adsorbed hydrocarbon to storage, and the displacement exchange fluid so separated is returned to the desorption stage.

In most instances the solubility of the non-adsorbable components of the feed mixture in the suspending liquid is substantially the same as that of the adsorbable components. Accordingly, and regardless of the particular method employed for desorption, it is desirable to treat the rich adsorbent slurry to remove dissolved but non-adsorbed hydrocarbons. This can be accomplished in several ways. For example, all or part of the rich adsorbent slurry can be heated to an extent sufficient to drive off dissolved non-adsorbed hydrocarbons but insufficient to effect any substantial degree of desorption of the adsorbed hydrocarbons. Alternately, all or part of the rich adsorbent can be fltered or otherwise treated to separate the suspending liquid containing the dissolved hydrocarbons, and the liquid can then be heated and/or gas or vacuum stripped to remove the dissolved hydrocarbons. The stripped liquid is then recombined with the rich solid adsorbent.

The following examples, described in connection with the drawing which accompanies and forms a part of this specification, will illustrate several ways in which the principle of the invention can be applied, but are not to be construed as limiting the same.

EXAMPLE I

Referring to FIGURE 1 of the accompanying drawing, which figure is in the form of a schematic flow sheet illustrating a simple embodiment of the invention in which desorption is effected thermally, a feed gas stream produced by distillation of the gasoline-containing effluent of a catalytic cracking process and having the following composition:

*Feed Gas Composition*

| Component: | Mol percent |
|---|---|
| Hydrogen and fixed gases | 26.3 |
| Methane | 32.2 |
| Ethylene | 7.4 |
| Ethane | 16.6 |
| Propylene | 7.5 |
| Propane | 7.4 |
| $C_4$ and $C_5$ | 2.6 |
| | 100.0 | is introduced into the adsorption system via line 10. The feed rate is about 50,000 s.c.f.h. Within the system, the feed stream is passed through heater 12, wherein it is heated to a temperature of about 110° F., and heated feed is then passed via line 14 into adsorption column 16. Within the latter, which is maintained at a temperature of about 100° F.–110° F. and at atmospheric pressure, the feed stream rises countercurrent to a descending stream of lean adsorbent slurry which is introduced into the top of column 16 from adsorbent recycle line 17 at a rate of about 80,000 lb./hr. Said adsorbent slurry consists of 25 percent by weight of a finely divided zeolitic sodium alumino silicate adsorbent having substantially uniform pores of about 4 A. in diameter (Linde "Molecular Sieves 4A"), suspended in 75 percent by weight of kerosene extract (boiling range=400° F.–500° F.). The non-adsorbed or raffinate gas stream leaves the top of column 16 via line 18 and is passed to cooler 20 wherein its temperature is reduced to about 90° F., and the cooled raffinate is passed via line 22 to vapor-liquid separator 24. Within separator 24, the small amount of kerosene extract contained in the raffinate gas separates as a subnatant liquid phase which is drawn off and introduced into adsorbent recycle line 17 via line 26. The lean gas product is withdrawn from separator 24 via line 28 at a rate of 42,600 s.c.f.h. This gas has the following composition:

*Lean Gas Product Composition*

| Component: | Mol percent |
|---|---|
| Hydrogen and fixed gases | 30.8 |
| Methane | 37.8 |
| Ethylene | 0.1 |
| Ethane | 19.4 |
| Propylene | 0.1 |
| Propane | 8.7 |
| $C_4$ and $C_5$ | 3.1 |
| | 100.0 |

The rich adsorbent is withdrawn from the bottom of column 16 via line 30 containing normally open block valve 31 and is passed by pump 32 through line 34 to the top of desorption column 36. The latter is operated at a temperature of about 400° F., heat being supplied thereto by means of internal heating coil 38. The desorbed or extract gas is removed from the top of column 36 via line 40, and is passed to cooler 42 wherein its temperature is reduced to about 90° F. From cooler 42 the cooled extract gas is passed via line 44 to gas-liquid separator 46 wherein the small amount of kerosene extract separates as a subnatant liquid phase. The latter is returned to the top of column 36 via line 48, and the gaseous phase in separator 46 is withdrawn therefrom via line 50 and passed to storage at a rate of about 7,400 s.c.f.h. as a rich gas product having the following composition:

*Rich Gas Product Composition*

| Component: | Mol percent |
|---|---|
| Hydrogen | 0.0 |
| Methane | 0.1 |
| Ethylene | 49.6 |
| Ethane | 0.1 |
| Propylene | 50.1 |
| Propane | 0.1 |
| $C_4$ and $C_5$ | 0.0 |
| | 100.0 |

The lean adsorbent slurry is withdrawn from column 36 through line 52, and is passed via pump 54 and line 56 to cooler 58 wherein it is cooled to a temperature of about 100° F.–110° F. From cooler 58 the lean adsorbent is returned to the top of adsorption column 16 via adsorbent recycle line 17.

Another embodiment of the invention as illustrated in FIGURE 1 entails particular treatment of the rich adsorbent slurry leaving adsorption column 16 via line 30. Normally open valve 31 is closed and normally closed valves 62 and 76 are opened. The rich adsorbent slurry then passes from adsorption column 16 via line 30, valve 62, and line 60 into liquid-solid separator 64 wherein the rich adsorbent is separated from the liquid suspending medium. The rich adsorbent is withdrawn from separator 64 via line 66 while the liquid suspending medium, substantially solids free, is passed via line 68 into stripper 70. In stripper 70, absorbed feed components are removed by conventional means, e.g., thermal stripping. The stripped liquid suspending medium is withdrawn from stripper 70 via line 74, the solids in line 66 are introduced into the stripped liquid suspending medium in line 74, and the resultant adsorbent slurry is returned to the inlet of pump 32 via line 74 and valve 76 for subsequent desorption of the rich adsorbent slurry as previously described in relation to FIGURE 1.

EXAMPLE II

Figure 2:
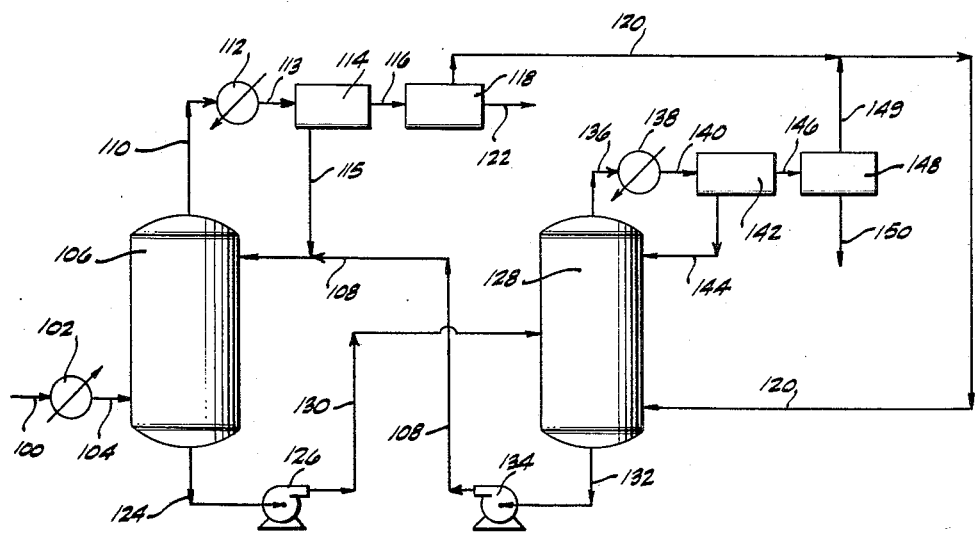

Referring now to FIGURE 2, which takes the form of a schematic flow diagram illustrating another embodiment of the invention wherein desorption of the rich adsorbent is effected by use of a displacement exchange fluid, a feed gas mixture having the same composition as that employed in Example I is introduced into the system via line 100 at a rate of about 50,000 s.c.f.h. Within the system, the feed stream is passed to feed heater 102 wherein it is heated to a temperature of about 110° F. at atmospheric pressure. The heated feed stream is then passed via line 104 to the bottom of adsorption column 106. The latter is operated at a temperature of 100° F.–110° F. and at atmospheric pressure. Within column 106 the gaseous feed stream rises countercurrent to a stream of adsorbent slurry which is introduced into the top of column 106 from adsorbent recycle line 108 at a rate of about 100,000 lb./hr. The adsorbent slurry itself consists of 70 percent by weight of kerosene extract (boiling range=400° F.–500° F.) and 30 percent by weight of a 100–200 mesh particle size zeolitic sodium alumino silicate having substantially uniform pores of about 4 A. in diameter, and contains adsorbed carbon dioxide by reason of the latter being employed as a displacement exchange fluid in the preceding desorption cycle. Within column 106, the ethylene and propylene components of the feed gas displace the adsorbed carbon dioxide from the adsorbent and are themselves adsorbed and withdrawn from column 106 as part of the rich adsorbent taken from the bottom of the column through line 124. The raffinate gas stream thus comprises carbon dioxide as well as the non-adsorbed components of the feed stream, and also contains a small amount of the kerosene extract in which the solid adsorbent is suspended. The raffinate gas is withdrawn from the top of column 106 via line 110 and is passed to cooler 112 wherein it is cooled to about 90° F. The cooled product is then passed via line 113 to a liquid-vapor separator 114 from which the liquid kerosene extract is passed via line 115 to adsorbent recycle line 108. The vapor stream taken from separator 114 is passed via line 116 to a separating means 118 wherein the carbon dioxide is separated from the non-adsorbed hydrocarbon and is returned to the system via carbon dioxide recycle line 120. The lean gas product is withdrawn from separator 118 via product line 122 at a rate of about 42,600 s.c.f.h. Its composition is substantially identical with that of the lean gas product obtained in Example I. The rich adsorbent slurry is taken from the bottom of column 106 via line 124 by pump 126 and is passed to the top of desorption column 128 through line 130. Desorption column 128 is operated at essentially the same temperature and pressure as adsorption column 106. Within column 128 the rich adsorbent slurry descends countercurrent to a stream of carbon dioxide which is introduced into the bottom of column 128 from carbon dioxide recycle line 120, and the adsorbed ethylene and propylene are replaced on the adsorbent by carbon dioxide. The lean adsorbent, containing adsorbed carbon dioxide, is taken from the bottom of column 128 by line 132 and is returned by pump 134 to the top of adsorption column 106 through adsorbent recycle line 108. The extract or desorbed stream is taken from the top of desorption column 128 and is passed through line 136, cooler 138, and line 140 to liquid-gas separator 142. Within the latter a small amount of the kerosene suspending liquid is separated as a subnatant liquid phase which is drawn off and returned to column 128 via line 144. The gaseous phase in separator 142 is withdrawn therefrom via line 146 and is passed to separating means 148 where the carbon dioxide displacement fluid is separated and returned to carbon dioxide recycle line 120 via line 149. The rich gas product is withdrawn from separating means 148 and passed to storage via rich gas product line 150 at a rate of about 7,400 s.c.f.h. The composition of this gas is substantially identical with that of the rich gas product obtained in Example I.

EXAMPLE III

The processing scheme and equipment is the same as that employed in Example II. The feed stream is a reformed aromatic gasoline having the following properties:

| | |
|---|---|
| Boiling range | $C_4$ to 400° F. end point. |
| Gravity, ° API | 49.8. |
| Aromatics, vol. percent | 44.4. |
| Normal paraffins, vol. percent | 12.9. |
| Knock rating (F–1+3 ml. TEL) | 96.2. |

The feed stream is vaporized by heating to about 410° F. and is passed into the adsorption column at a rate of about 20,000 s.c.f.h. The adsorbent slurry consists of about 1 part by weight of a zeolitic calcium sodium alumino silicate having substantially uniform pores of about 5 A. in diameter (Linde "Molecular Sieves 5A") and 2 parts by weight of naphthalene, and is fed to the top of the adsorption column at a rate of about 60,000 lb./hr. The adsorption column is operated at a temperature of about 410° F. and at atmospheric pressure. Ammonia is employed as the displacement exchange fluid in the desorption column; consequently, the lean adsorbent contains adsorbed ammonia. The raffinate stream is processed as described above to recover a small amount of naphthalene, which is returned to the top of the adsorption column, and to separate off the ammonia. The naphthalene-free and ammonia-free product gasoline is produced at a rate of 17,350 s.c.f.h., and has the following properties:

| | |
|---|---|
| Boiling range | $C_4$—400° F. end point. |
| Aromatics, vol. percent | 50.7. |
| Normal paraffin, vol. percent | 0.5. |
| Gravity, ° API | 41.4. |
| Knock rating (F–1+3 ml. TEL) | 99.8. |

The rich adsorbent is desorbed employing ammonia as a displacement exchange fluid at a temperature of about 400° F.–410° F. under atmospheric pressure. The lean adsorbent is returned to the adsorption column, and the extract stream is treated as previously explained to remove naphthalene and to recover ammonia. The naphthalene-free and ammonia-free extract gasoline has the following properties:

| | |
|---|---|
| Boiling range | $C_4$—400° F. |
| Normal paraffins, vol. percent | 97.0. |
| Other hydrocarbons, vol. percent | 3.0. |
| Knock rating (F–1 clear) | [1] 8. |

[1] Blending number in iso-octane, 50/50 blend.

While the invention has been described above broadly as well as by way of specific examples, it is to be understood that any of the techniques and equipment conventionally applied to adsorption separation processes can be employed without departing from the scope of the invention. The adsorption and desorption columns comprise bubble cap trays, perforated trays, disc-and-donut assemblies, etc., and can be provided with reboilers, reflux condensers, etc. Similar means can be provided in the system for periodic re-activation of the solid adsorbent, as by contacting with a hot reactivating gas such as flue gas, steam, etc. Also, the feed stream can be pre-treated in various ways to remove contaminants, e.g., polar compounds, which interfere with the adsorption capacity of the adsorbent for hydrocarbons. Other modifications within the scope of the invention will be apparent to those skilled in the art.

In the following claims, the process of the invention is defined in terms of the separation of "hydrocarbon mixtures." It is to be understood that such term is meant to include mixtures of hydrocarbons which also contain small normally incident amounts of nitrogen, sulfur and oxygen compounds as well as normally incident inert gases such as nitrogen, hydrogen, carbon dioxide, etc.

Other modes of applying the principle of my invention may be employed instead of those explained, change being made as regards the methods or materials employed, provided the step or steps or the equivalent of such stated step or steps be employed.

I, therefore, particularly point out and distinctly claim as my invention:

1. The process which comprises: (1) introducing into an adsorption zone a gaseous hydrocarbon feed mixture; (2) introducing into said adsorption zone a lean circulable adsorbent slurry comprising a granular partially dehydrated crystalline zeolitic metallo alumino silicate adsorbent having substantially uniform diameter pores between about 4 A. and about 5.5 A. in diameter and an inert organic liquid suspending medium which is substantially non-adsorbed by said granular adsorbent, which has a boiling point substantially higher than said hydrocarbon feed mixture, and in which the hydrocarbon components of said feed mixture are soluble to an extent of at least about 0.1 percent by weight; (3) intimately contacting said feed mixture with said lean adsorbent slurry in said adsorption zone whereby there is produced a first rich adsorbent slurry comprising said silicate containing selectively adsorbed hydrocarbon components of said feed mixture and a raffinate gas phase comprising unadsorbed hydrocarbons; (4) withdrawing said raffinate gas phase from said adsorption zone; (5) withdrawing said first rich adsorbent slurry from said adsorption zone; (6) separating said first rich adsorbent slurry into a rich solid adsorbent and a rich liquid suspending medium; (7) treating said separated rich liquid suspending medium to strip absorbed feed components therefrom; (8) combining said stripped liquid suspending medium and said separated rich adsorbent to form a second rich adsorbent slurry; (9) treating said second rich adsorbent slurry in a desorption zone to remove said selectively adsorbed hydrocarbon components therefrom to produce a lean adsorbent slurry; and (10) returning said lean adsorbent slurry to said adsorption zone for reuse.

2. A process according to claim 1 wherein said treatment in said desorption zone comprises contacting said rich adsorbent with a displacement exchange fluid which is capable of replacing the components of the feed mixture adsorbed in said rich adsorbent, which is dissolved in said inert liquid suspending medium, and which is readily separable from said adsorbed components of said feed mixture.

3. A process according to claim 2 wherein said adsorption and desorption zones are maintained at substantially the same temperature and pressure.

4. A process according to claim 1 wherein the said hydrocarbon feed mixture comprises straight-chain and non-straight-chain hydrocarbons, and said adsorbent is a zeolitic calcium sodium alumino silicate having substantially uniform pores of about 5 A. in diameter.

5. A process according to claim 4 wherein the said treatment in said desorption zone comprises contacting the said rich adsorbent with an inert gas which is capable of replacing the components of the feed mixture adsorbed in said rich adsorbent, which is dissolved in said inert liquid suspending medium, which is readily separable from the components of said feed mixture, and which has a separation factor with respect to the selectively adsorbed hydrocarbons of between about 0.1 and about 10.

6. A process according to claim 1 wherein the said hydrocarbon feed mixture comprises at least one olefin containing not more than 3 carbon atoms and hydrocarbons other than said olefin, and said adsorbent is a zeolitic sodium alumino silicate having substantially uniform pores of about 4 A. in diameter.

7. A process according to claim 6 wherein the said treatment in said desorption zone comprises contacting the said rich adsorbent with an inert gas which is capable of replacing the components of the feed mixture adsorbed in said rich adsorbent, which is dissolved in said inert liquid suspending medium, which is readily separable from the components of said feed mixture, and which has a separation factor with respect to the selectively adsorbed hydrocarbon of between about 0.1 and about 10.

8. The process which comprises: (1) introducing into an adsorption zone a gaseous hydrocarbon feed mixture comprising straight-chain and non-straight-chain hydrocarbons; (2) introducing into said adsorption zone a lean circulable adsorbent slurry comprising a granular partially dehydrated crystalline zeolitic calcium sodium alumino silicate adsorbent having substantially uniform pores of about 5 A. in diameter and having adsorbed thereon the displacement exchange fluid hereinafter defined and an inert liquid suspending medium which is substantially non-adsorbed by said granular adsorbent, which has a boiling point substantially higher than said hydrocarbon feed mixture, and in which the straight-chain hydrocarbon components of said feed mixture are soluble to an extent of at least about 0.1 percent by weight; (3) intimately contacting said gaseous feed mixture with said lean adsorbent and said liquid suspending medium in said adsorption zone whereby there is produced a rich adsorbent slurry having said straight-chain hydrocarbons adsorbed therein and a raffinate gas comprising non-adsorbed non-straight-chain hydrocarbons and said displacement exchange fluid; (4) withdrawing said raffinate gas from said adsorption zone and separating said displacement exchange fluid therefrom; (5) withdrawing said rich adsorbent slurry from said adsorption zone and introducing it into a desorption zone; (6) introducing the separated displacement exchange fluid obtained in step (4) into said desorption zone, said displacement exchange fluid being an inert gas which is capable of replacing the said straight-chain hydrocarbons adsorbed in said adsorbent, which is dissolved in said inert liquid suspending medium, and which is readily separable from the components of said feed mixture; (7) intimately contacting said rich adsorbent slurry with said gaseous displacement exchange fluid in said desorption zone whereby there is obtained said lean adsorbent slurry and an extract gas comprising said straight-chain hydrocarbons and said displacement exchange fluid; (8) withdrawing said lean adsorbent slurry from said desorption zone and returning it to said adsorption zone; (9) withdrawing said extract gas from said desorption zone and separating said displacement exchange fluid therefrom; and (10) returning the separated displacement exchange fluid to said desorption zone.

9. A process according to claim 8 wherein said adsorption and desorption zones are maintained at substantially the same temperature and pressure.

10. The process which comprises (1) introducing into an adsorption zone a gaseous hydrocarbon feed mixture comprising at least one olefin containing not more than 3 carbon atoms and hydrocarbons other than said olefin hydrocarbons; (2) introducing into said adsorption zone a circulable lean adsorbent slurry comprising a granular partially dehydrated crystalline zeolitic sodium alumino silicate adsorbent having substantially uniform pores of about 4 A. in diameter and having adsorbed thereon the displacement exchange fluid hereinafter defined, and an inert liquid suspending medium which is substantially non-adsorbed by said granular adsorbent, which has a boiling point substantially higher than said hydrocarbon feed mixture, and in which the said olefin hydrocarbon component of said feed mixture is soluble to an extent of at least about 0.1 percent by weight; (3) intimately contacting said gaseous feed mixture with said lean adsorbent and said liquid suspending medium in said adsorption zone whereby there is produced a rich adsorbent having said olefin hydrocarbon adsorbed therein and a raffinate gas comprising said other hydrocarbons and said displacement exchange fluid; (4) withdrawing said raffinate gas from said adsorption zone and separating said displacement exchange fluid therefrom; (5) withdrawing said rich adsorbent slurry from said adsorption zone and introducing it into a desorption zone; (6) introducing the separated displacement exchange fluid obtained in step (4) into said desorption zone, said displacement exchange fluid being an inert gas which is capable of replacing the said olefin hydrocarbon adsorbed in said rich adsorbent, which is dissolved in said inert liquid suspending medium, and which is readily separable from the components of said feed mixture; (7) intimately contacting said rich adsorbent slurry with said gaseous displacement exchange fluid in said desorption zone whereby there is obtained a lean adsorbent slurry and an extract gas comprising said olefin hydrocarbon and said displacement exchange fluid; (8) withdrawing said lean adsorbent slurry from said desorption zone and returning it to said adsorption zone; (9) withdrawing said extract gas from said desorption zone and separating said displacement exchange fluid therefrom; and (10) returning the separated displacement exchange fluid to said desorption zone.

11. A process according to claim 10 wherein said adsorption and desorption zones are maintained at substantially the same temperature and pressure.

12. The process which comprises: (1) introducing into an adsorption zone a gaseous feed mixture; (2) introducing into said adsorption zone a lean circulable adsorbent slurry comprising a granular adsorbent selective for one of the components of said mixture and having displacement exchange fluid adsorbed thereon, and an inert liquid suspending medium which is substantially non-adsorbed by said granular adsorbent, which has a boiling point substantially higher than said feed mixture, and in which the selectively adsorbed component of said feed mixture is soluble to an extent of at least about 0.1 percent by weight; (3) intimately contacting said gaseous feed mixture with said lean adsorbent and said liquid suspending medium in said adsorption zone whereby there is produced a rich adsorbent slurry comprising said adsorbent having a selectively adsorbed component of said feed mixture adsorbed therein and a raffinate gas comprising non-adsorbed components and said displacement exchange fluid; (4) withdrawing said raffinate gas from said adsorption zone and separating said displacement exchange fluid therefrom; (5) withdrawing said rich adsorbent slurry from said adsorption zone and introducing it into a desorption zone; (6) introducing the separated displacement exchange fluid obtained in step (4) into said desorption zone, said displacement exchange fluid being an inert gas which is capable of replacing said selectively adsorbed component on said adsorbent, which is dissolved in said inert liquid suspending medium, and which is readily separable from the components of said feed mixture; (7) intimately contacting said rich adsorbent slurry with said gaseous displacement exchange fluid in said desorption zone whereby there is obtained said lean adsorbent slurry and an extract gas comprising said selectively adsorbed component of said feed mixture and said displacement exchange fluid; (8) withdrawing said lean adsorbent slurry from said desorption zone and returning it to said adsorption zone; (9) withdrawing said extract gas from said desorption zone and separating said displacement exchange fluid therefrom;

and (10) returning the separated displacement exchange fluid to said desorption zone.

13. The process which comprises: (1) introducing into an adsorption zone a gaseous feed mixture; (2) introducing into said adsorption zone a lean circulable adsorbent slurry comprising a granular adsorbent which is selective for a component of said feed mixture and an inert liquid suspending medium which is substantially non-adsorbed by said granular adsorbent, which has a boiling point substantially higher than said feed mixture, and in which the components of said feed mixture are soluble to an extent of at least about 0.1 percent by weight; (3) intimately contacting said feed mixture with said lean adsorbent slurry in said adsorption zone whereby there is produced a first rich adsorbent slurry comprising said granular adsorbent containing the selectively adsorbed component of said feed mixture and a raffinate gas phase comprising the unadsorbed components of said feed mixture; (4) withdrawing said raffinate gas phase from said adsorption zone; (5) withdrawing said first rich adsorbent slurry from said adsorption zone; (6) separating said first rich adsorbent slurry into a rich solid adsorbent and a rich liquid suspending medium; (7) treating said separated rich liquid suspending medium to strip adsorbed feed components therefrom; (8) combining said stripped liquid suspending medium and said separated rich adsorbent to form a second rich adsorbent slurry; (9) treating said second rich adsorbent slurry in a desorption zone to remove said selectively adsorbed component therefrom to produce a lean adsorbent slurry; and (10) returning said lean adsorbent slurry to said adsorption zone for reuse.

References Cited in the file of this patent
UNITED STATES PATENTS

| | | |
|---|---|---|
| 2,768,942 | Marple et al. | Oct. 30, 1956 |
| 2,818,137 | Richmond et al. | Dec. 31, 1957 |
| 2,818,455 | Ballard et al. | Dec. 31, 1957 |
| 2,823,765 | Maslan | Feb. 18, 1958 |
| 2,841,471 | Sensel | July 1, 1958 |
| 2,858,901 | Fort | Nov. 4, 1958 |
| 2,882,243 | Milton | Apr. 14, 1959 |
| 2,904,507 | Jahnig | Sept. 15, 1959 |
| 2,938,864 | Fleck et al. | May 31, 1960 |
| 2,944,092 | Feldbauer et al. | July 5, 1960 |

OTHER REFERENCES

Chemical and Engineering News, vol. 32, page 4786, November 1954.